United States Patent [19]

Tokuyama

[11] Patent Number: 5,729,628
[45] Date of Patent: Mar. 17, 1998

[54] IMAGE SEGMENTING METHOD AND APPARATUS

[75] Inventor: Takeshi Tokuyama, Machida, Japan

[73] Assignee: International Business Machines Corporation, Armonk, N.Y.

[21] Appl. No.: 640,304

[22] Filed: Apr. 30, 1996

[30] Foreign Application Priority Data

Jun. 15, 1995 [JP] Japan .................................. 7-148562
Feb. 2, 1996 [JP] Japan .................................. 8-017249

[51] Int. Cl.$^6$ .................................................. G06K 9/34
[52] U.S. Cl. .......................................... 382/173; 382/286
[58] Field of Search ................................. 382/173, 180, 382/203, 204, 286; 395/783

[56] References Cited

U.S. PATENT DOCUMENTS 5,588,072 12/1996 Wang ........................... 382/180

*Primary Examiner*—Leo Boudreau
*Assistant Examiner*—Phuoc Tran
*Attorney, Agent, or Firm*—Whitham, Curtis, Whitham & McGinn; Robert P. Tassinari, Jr.

[57] ABSTRACT

A clear partial image of predetermined size can be segmented at high speed. The method for segmenting a partial image from a whole image comprising a plurality of pixels with gray levels comprises the steps of: inputting a number k of pixels of the partial image to be segmented; detecting a partial image maximizing:

$$U_\alpha(S) = n \sum_{(i,j) \in S} g(i,j) - \alpha |S|$$

where n is the number of pixels of the whole image, g(i, j) is the gray level of a pixel (i, j), $\alpha$ is a parameter, and $|S|$ is the number of pixels of the partial image S; comparing the number $|S|$ of pixels of the partial image S maximizing $U_\alpha(S)$ with the inputted number k; increasing a value of $\alpha$ if $|S|>k$ and decreasing the value of $\alpha$ if $|S|<k$; again executing the steps subsequent to the specifying step using the updated $\alpha$; and outputting said partial image S which maximizes $U_\alpha(S)$ if $|S|=k$.

9 Claims, 6 Drawing Sheets

IMAGE SEGMENTING METHOD AND APPARATUS

FIELD OF THE INVENTION

This invention relates to a method and apparatus for segmenting a characteristic image area from an image with gray levels, and more particularly to a method which performs an operation similar to focusing of a camera by changing parameters of a novel objective function and also segments a clear image of predetermined size.

BACKGROUND OF THE INVENTION

Figure 1:
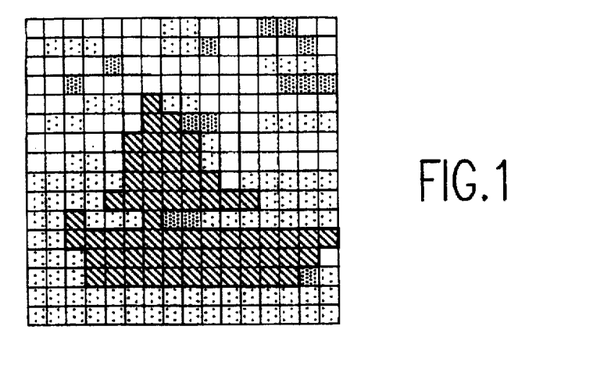
FIG. 1 is a diagram showing an example of an image which is clear in light and shade.

A photograph in a newspaper or the like is an image expressed in terms of pixels with several different gray levels. To retrieve a desired object from this image, first the object has to be separated from other areas of the image. So, we will consider a problem that a partial image which has given size is segmented from an image where the image has n pixels and each pixel is given a gray level. As shown in FIG. 1, the pixels of this partial image are connected and the gray level of the partial image must be higher than that of the background area. But, generally if this problem is solved with connectivity only, the corresponding optimization problem becomes an NP (nondeterministic polynomial time) —hard problem (problem where it has well been predicted to take a labor of calculation exponentially) and it will take unrealistic time and labor to directly solve.

Then, there has been proposed a method of simply collecting pixels in order of darker pixel (for example, P. P. Sahoo, S. Soltani, and A. K. C. Wong, "A survey of thresholding techniques," Comput. Vis., Graph. Image Process., Vol. 41, pp. 233–260, 1988) or an area method of collecting adjacent and near dark pixels. These methods, however, have a disadvantage that connectivity is not guaranteed, and also it is difficult to cope with stains on a display screen and or noise.

Figure 2:
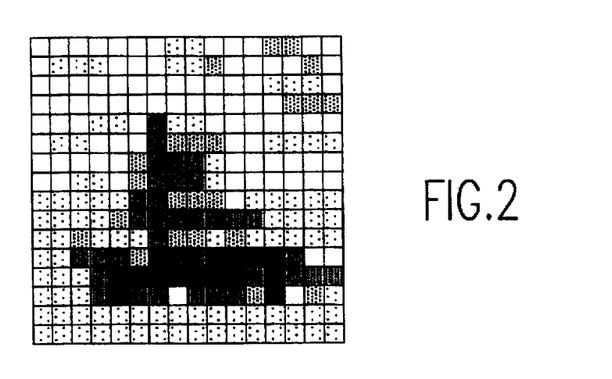
FIG. 2 is a diagram showing an example of an image which is unclear in light and shade, as compared to FIG. 1.

Also, there is a method of detecting a boundary curve by use of the difference operation (for example, L. S. Davis, "A survey of edge detection techniques," Comput. Graph. Image Process., Vol. 4, pp. 248–270, 1975), but this method is only able to cope with a clear image such, for example, as that shown in FIG. 1 where a boundary curve is clearly obtained. It cannot be said that this method is effective in an image such as the one shown in FIG. 2. In addition, there has been proposed a method which is used jointly with the aforementioned method (for example, P. J. Besl and R. C. Jain, "Segmentation through variable-order surface fitting," IEEE Trans. Pattern and Machine Intell., Vol. 10, pp. 167–192, 1988), but disadvantages cannot be overcome completely.

Figure 3:
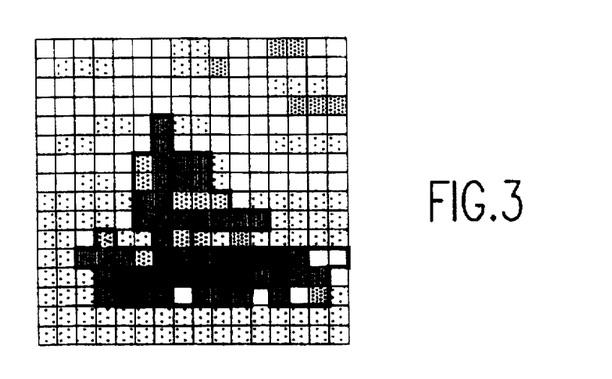
FIG. 3 is a diagram showing an example of an image with general connectivity.
Figure 4:
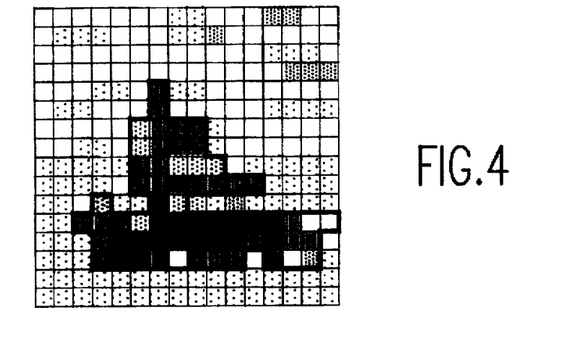
FIG. 4 is a diagram showing an example of an admissible image.

Furthermore, there has been proposed a method defining a connected image (FIG. 4) which intersects with each column in a connected interval (vertical convexity) as an admissible image. In this method, an algorithm obtaining the optimal admissible image using a statistical covariance as an objective function is proposed, and the general segmentation problem is solved by using this algorithm as a tool (for example, T. Asano, D. Z. Chen, N. Katoh and T. Tokuyama, "Polynomial-Time Solutions to Image Segmentation," Preprint, 1994). An image with general connectivity can be grasped as an image obtained by subtracting some other admissible images from an admissible image in the manner of a set theory. For example, an image with general connectivity (FIG. 3) is included in an admissible image (FIG. 4). This method has a disadvantage that the calculation of the admissible image requires considerable time such as $O(n^{2.5})$ and the size of an image which is segmented cannot be controlled. ($O(n^{2.5})$ means that the computing time is proportional to $n^{2.5}$).

OBJECTS OF THE INVENTION

Thus it takes a large amount of calculation to segment a clear partial image of predetermined size from a whole image, and this amount of calculation is hardly practical.

It is accordingly an object of the present invention to segment a partial image which is a clear admissible image close to a predetermined size, while reducing computing time drastically.

SUMMARY OF THE INVENTION

To achieve this object, this invention is a method for segmenting a partial image from a whole image having a plurality of pixels with gray levels and comprises the following steps: inputting a number k of pixels of the partial image to be segmented; detecting a partial image maximizing $$U_\alpha(S) = n \sum_{(i,j) \in S} g(i,j) - \alpha |S| \qquad (1)$$

where n is the number of pixels of the whole image, g(i,j) is the gray level of a pixel (i, j), α is a parameter, and |S| is the number of pixels of the partial image S; comparing the number |S| of pixels of the partial image S maximizing $U_\alpha(S)$ with the specified number k; increasing a value of α if |S|≦k and decreasing the value of α if |S|<k; again executing the steps subsequent to the specifying step using the updated α; and outputting the partial image S which maximizes $U_\alpha(S)$ if |S|=k. A clear partial image which has predetermined size can be segmented at high speeds by introducing Equation (1) which is a novel objective function and increasing and decreasing the parameter α to regulate the image size.

It is considered that in the detecting step, the whole image is decomposed into a plurality of column areas, and then a dynamic programming is performed for the decomposed column areas. In this case, the image segmented is an admissible image.

It is also considered that a evaluation value is defined as a value which is calculated by subtracting a product value of α and the number of pixels within a partial image from a total sum of the gray levels of the pixels within the partial image, and the detecting step comprises the sub-steps of: determining a range of the pixels in each column of the whole image, wherein the range includes at least one particular pixel and has a maximum evaluation value within the column; when an addition region including an area which includes a first pixel (coordinates (m–1,l)) in a previous column of a second pixel (coordinates (m,t)) in the whole image and has a maximum evaluation value up to the previous column and a range which includes the second pixel and a third pixel (coordinate (m,l)) located in the same row as the first pixel and in the same column as the second pixel and has a maximum evaluation value within the column of the third pixel and the second pixel, wherein the range is determined by the determining step, is defined, for each of the second pixels, detecting one of the first pixels whose inclusion in the addition region makes the evaluation value of the addition region maximum, and storing the evaluation value of the addition region and the one of the first pixel; and detecting one second pixel included in the addition region which has a maximum evaluation value in the whole image, and determining a partial image S by using the detected first pixel for the detected second pixel.

It is possible to generalize the above method as follows: that is, a method for segmenting a partial image from a whole image having a plurality of pixels with gray levels, the partial image being convex in the direction of the column in the whole image, comprising the steps of: inputting a predetermined condition N; determining a range of the pixels in each column of the whole image, wherein the range includes at least one particular pixel and has a maximum evaluation value within the column, the evaluation value being a total sum of a value (g(i,j)–N) calculated by subtracting the N from a gray level g(i,j) of each of pixels within the partial image; when an addition region including a area which includes a first pixel (coordinates (m–1,l)) in a previous column of a second pixel (coordinates (m,t)) in the whole image and has a maximum evaluation value up to the previous column and a range which includes the second pixel and a third pixel (coordinate (m,l)) located in the same row as the first pixel and in the same column as the second pixel and has a maximum evaluation value within the column of the third pixel and the second pixel, the range being determined by the determining step, is defined, for each of the second pixels, detecting one of the first pixels whose inclusion in the addition region makes the evaluation value of the addition region maximum, and storing the evaluation value of the addition region and the one of the first pixel; and detecting one second pixel included in the addition region which has a maximum evaluation value in the whole image, and determining a partial image S by using the detected first pixel for the detected second pixel.

DETAILED DESCRIPTION OF THE PREFERRED EMBODIMENTS

Figure 5:
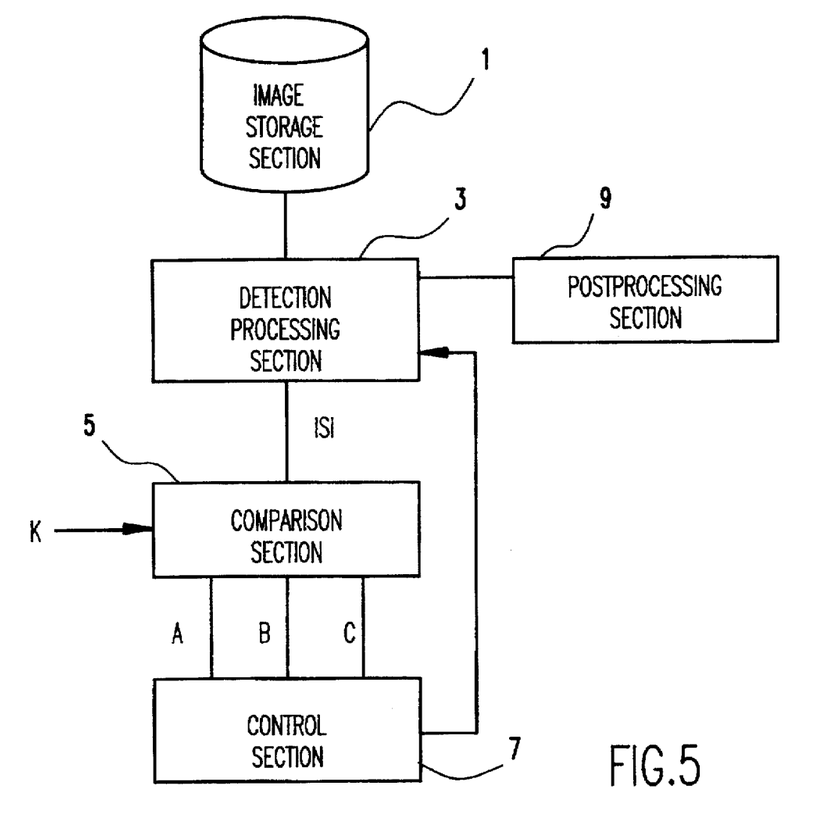
FIG. 5 is a diagram showing the constitution of an apparatus of an embodiment of this invention.

This invention will be described with FIGS. 5 and 6. The constitution of an apparatus according to this invention is shown in FIG. 5. The apparatus shown in the figure is constituted by an image storage section 1 where one or a plurality of images each having n pixels with gray levels have been stored, a detection processing section 3 reading an image from the image storage section 1 and processing it, a comparison section 5 receiving a signal representative of |S| from the detection processing section 3 and comparing the received signal with a signal representative of the size, k, of a partial image which is an inputted admissible image, a control section 7 receiving signals A, B, and C representative of the comparison result from the comparison section 5 and performing the control of the detection processing section 3, and a postprocessing unit 9 receiving a detected clear image of predetermined size from the detection processing 3 and performing postprocessing, for example, displaying that image. This postprocessing unit 9 may be a unit such as not only displaying a clear image of predetermined size but also detecting sub-image having general connectivity if it is an admissible image or performing a comparison with a predetermined image.

Now, the operation of the above-described apparatus will be described with FIG. 6. If processing is started, then k representing the size of the image to be detected is inputted to the comparison section 3 (step 23). In the initializing operation, the parameter $\alpha$ within the detection processing section 3 is set to 0 and a variable $\epsilon$ regulating this $\alpha$ is set to n (step 25). Then, the detection processing section 3 takes out a sheet of image which is processed from the image storage section 1. This detection processing section 3 deals with the following objective function.

$$U_\alpha(S) = n \sum_{(i,j) \in S} g(i,j) - \alpha |S| \qquad (2)$$

In Equation 2, where n is the number of pixels of a processed image, g(i,j) is the gray level in a pixel (i,j) of i-th row and j-th column of that image, S is the area of a partial image which is segmented, a previously initialized $\alpha$ is a parameter which is a real number, and |S| is the number of pixels of a partial image S (size of S). For the following description, assume there is $0 \leq g(i,j) \leq 1$, but this assumption can easily be removed.

And, the detection processing section 3 detects a partial image S which is an admissible image such as maximizing $U_\alpha(S)$ with respect to a certain $\alpha$ (step 27). As previously stated, at first $\alpha$ has been set to 0. This step 27 has a great influence on the high-speed operation of overall processing. The algorithm first gives the numberings of columns of the whole image, and then processes by using a dynamic programming where the column number is used as an index. In other words, each column is first processed individually then the dynamic programming connects these processed columns. If done like this, a matrix which appears in this dynamic programming will have a pseudo convex property called a "Monge property", and if an interval-sum query data structure (for example, A. Aggarwal and T. Tokuyama, "Consecutive Interval Query and Dynamic Programming on Intervals," LNCS 762, Proc. ISAAC 93, pp. 466–475, 1993) is used, the computing time will become O(n) and the operation will be performed at very high speed. The detail of this process is described below. The present invention, however, is not limited to a method such as this.

The partial image S, detected by this processing, is largest in sum of gray levels among admissible images having the same number of pixels. And, an admissible image maximizing $U_\alpha(S)$ with respect to a certain $\alpha$ is referred to as a focused image. In fact an image which is not a focused image is almost always unclear even when it is viewed with human eyes.

The detecting processing section 3, if detecting a focused image S with respect to a certain $\alpha$, will output the size |S| to the comparison section 5. Since this |S| is used during calculation of $U_\alpha(S)$, it does not need to be calculated again. In the comparison section 5, |S| is compared with a previously inputted and desired size, k, of a image (steps 29, 31). If, in step 29, k=|S|, then the comparison section 5 will activate the output A to the control section 7 active. Since this is a focused image and the size is a desired one, the processing is ended. The control section 7, then, instructs the detection processing section 3 to output the detected focused image to the postprocessing unit 9 (step 37).

On the other hand, if k is not equal to |S|, then whether k<|S| will be checked (step 31). When this condition applies, the comparison section 5 activates the output B to the control section 7. In this case, the control section 7 instructs the detection processing section 3 to increase α by the amount of the variable ε (step 33).

If k<|S| fails, then k>|S| should hold. In this case, the comparison section 5 activates the output C to the control section 7. Then, the control section 7 instructs the detection processing section 3 to decrease α by the amount of the variable ε (step 35).

In order to control the variable ε to increase and decrease α, a binary search can be used. That is, as set in step 25, let the initial value of ε be n, and the control section 7 reduces this ε to half each time processing is repeated (step 41). And, when ε becomes less than 1/γ, the control section 7 stops the processing and instructs the detection processing section 3 to output the current image, because there is no further improvement (step 43). It has been found, together with the implementing method of the previous step 27, that a focused image closest to a desired size k is calculated by O (n log γ). This γ is called accuracy in problem, and normally even if γ is n, there will be no problem. The focused image, then, can be calculated by O (n log n).

One of the embodiment of this invention is described above, however, this invention is not limited to this one of the embodiment. For example, although the comparison section 5 shown in FIG. 5 has three output lines, it will not be limited to three output lines if it can indicate three states. For example, three of four states which can be expressed by two output lines can be allocated to the respective states, or three different states may be expressed with a single output line. Also, although in steps 29 and 31 the three states are detected, this order is arbitrary, so the k>|S| detected last may be first detected.

Figure 6:
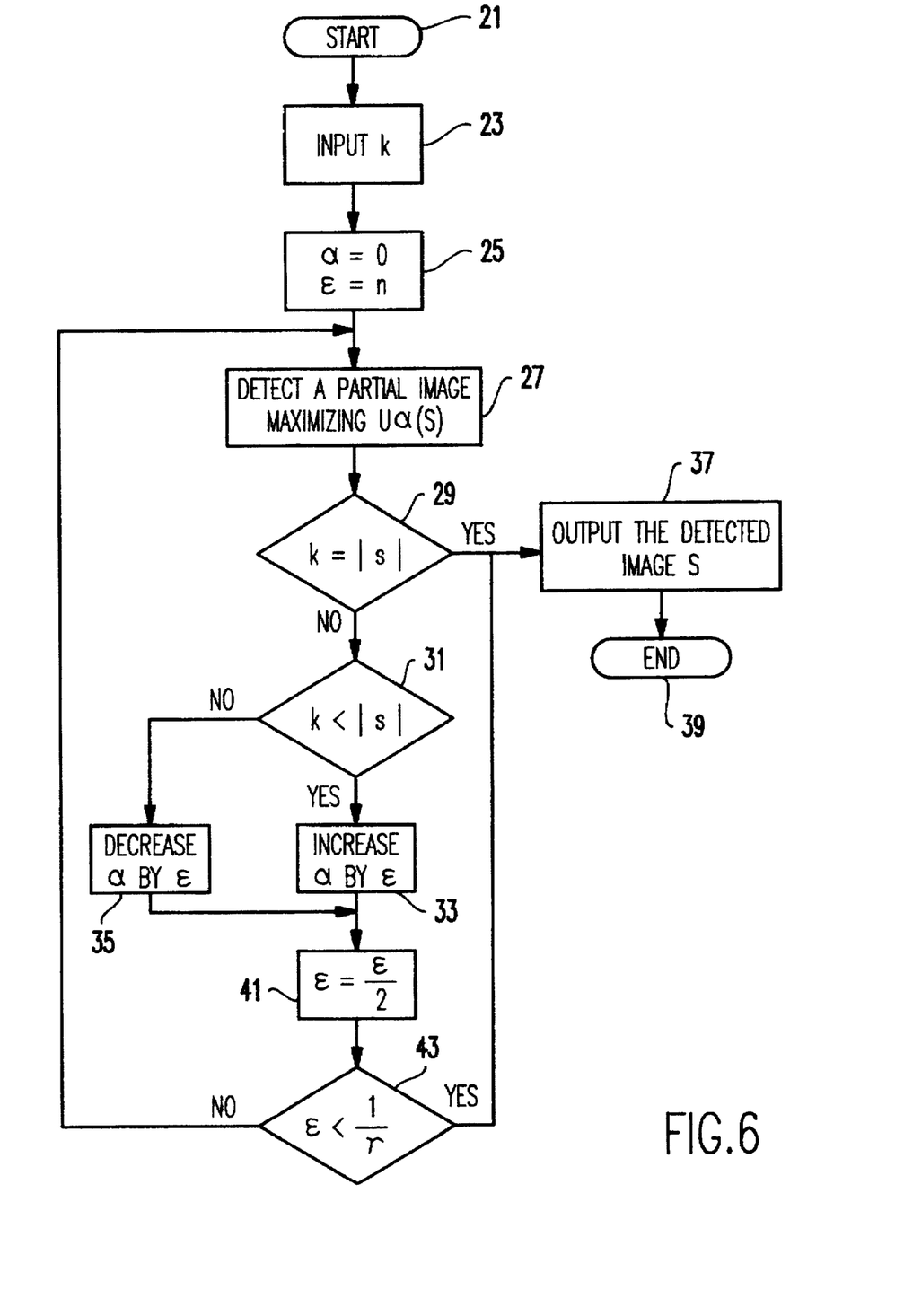
FIG. 6 is a diagram showing the processing operation of the apparatus shown in FIG. 5.

In addition, while it has been described that this invention is carried out by means of particular units shown in FIG. 5, this invention can also be carried out by a general computer system executing a program such as that shown in FIG. 6. In such a case, a central processing unit is substituted for the detection processing section 3, the comparison section 5, and the control section 7, and if necessary, includes the postprocessing unit 9 as well. Furthermore, when the postprocessing unit 9 only performs display output processing, it may be replaced with an exclusive graphic processing adapter. Finally, the image storage section 1 may be either an sub-storage or a main storage.

Appendix

Figure 7:
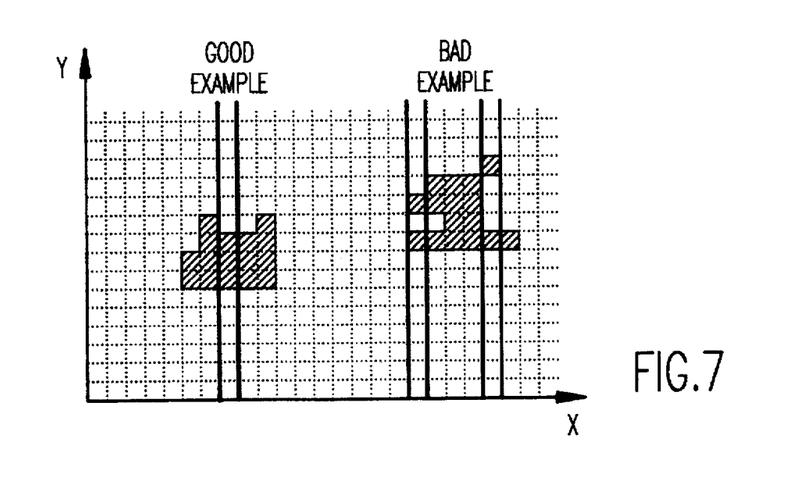
FIG. 7 is a diagram showing an example of an admissible image.

Here, process for segmenting an admissible image, which maximizes $U_\alpha$, from an image with gray levels is described in detail. The admissible image means, as described earlier, an image which is convex along one axial direction. More precisely, it means a connected image surrounded by two monotonic curves in the X-axis direction. Examples of this are shown in FIG. 7. In the left, there is shown an example where an image is always connected when it is cut by bands with width 1 extending in the Y-direction. Such image is called an admissible image. On the other hand, in the right, there is shown an example where an image is not connected when it is cut by the bands described above. When it is attempted to perform segmentation including such image, such problem would be an NP-hard problem.

When the problem is limited to such admissible image, since bands extending in the Y-direction are always connected, it is necessary to sequentially connect them by using dynamic programming. However, one more parameter such as number of pixels should be specified.

Figure 8:
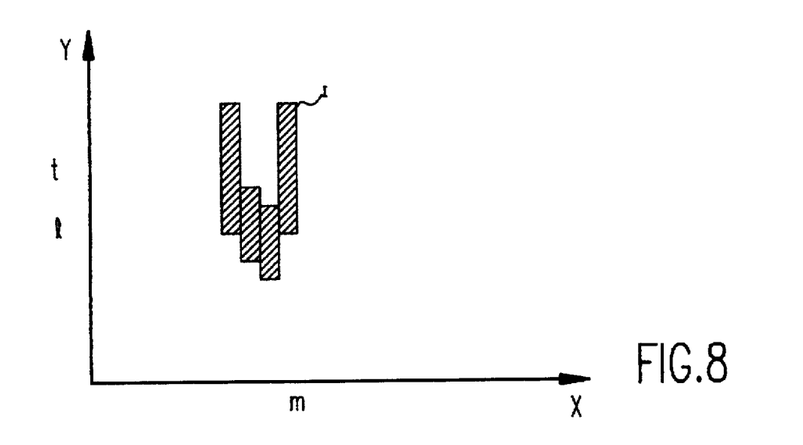
FIG. 8 is a diagram for explaining the connectivity between columns.

Connectivity of the entire admissible image can be understood when considering the following item. When an image containing k pixels, consisting of pixels onto the left of m-th column, and containing a position (m, t) is assumed (see FIG. 8), and if total of the degree of the gray level is f (k, m, t), this image satisfies:

$$f(k,m,t) = \max_{t,l \in I} \left\{ f(k-|l|,m-1,l) + \sum_{i \in I} g(m,i) \right\} \quad (3)$$

I is a continuous interval (range) at the m-th column on the X-axis, and contains t, l. In addition, since the continuous interval (range) at the (m−1)-th column on the X-axis used in calculating f (k−|I|m−1, l) contains l, it connects to I. Therefore, all of the continuous intervals used until f (k, m, t) is found are guaranteed to be connected from the induction.

Furthermore, Equation 2 can be modified as follows. When pixels contained in a partial image S are divided into columns I, the number of pixels and sum of degree of the gray level in each column are represented as Hk and Gk, respectively, by using their column number k, and a set of numbers for columns contained in the partial image S is represented by R, the equation is modified as:

$$U_\alpha(S) = n \sum_{k \in R} GK - \alpha \sum_{k \in R} Hk \quad (4)$$

$$= \sum_{k \in R} (nGk - \alpha Hk)$$

Thus, maximization of $U_\alpha(S)$ is to connect columns of an image with gray levels, each of which makes (nGk−αHk) maximum even for each column k in the partial image S.

Then, when Equations 3 and 4 are considered together and α is given, the following equation U (m, t) can be derived to find a partial image S maximizing Equation 2.

$$U(m,t) = \max_{t,l \in I} \left\{ U(m-1,l) + n \sum_{i \in I} g(i,m) - \alpha Hm \right\} \quad (5)$$

$$= \max_{l} \left\{ (m-1,l) + \max_{t,l \in I} \left[ n \sum_{i \in I} g(i,m) - \alpha Hm \right]_A^B \right\}$$

A in Equation 5 means to determine from the entire continuous interval (range) containing t and l a continuous interval (range) I maximizing B in Equation 5.

This I is represented as cover (t, l). Now, if t≦l, and low (t) and high (l), which are defined later, are used, $$\text{cover}(t, l) = [\text{low}(t), t] \cup [t, l] \cup [l, \text{high}(l)] \quad (6)$$

where low(t) is i maximizing B in Equation 5 in the continuous interval [i, t], while high(l) is j maximizing B in Equation 5 in the continuous interval [l, j].

Since these low(t) and high(l) are frequently used in the dynamic programming, it is effective if they are quickly found. To this end, a matrix K is constructed in which B in Equation 5 of the continuous interval [i, j] is contained in an element K (i,j), where K(i,j)=(i−j)×for i>j (x is a negative value with a sufficiently large absolute value. For example, it is sufficient to be a number the absolute value of which is larger than sum for entire g(i,j)). Then, the column number for a column having the maximum value at row number l in K(i,j) becomes high(l). Thus, the problem to find high(l) for all l∈[1, N] becomes a problem to find column numbers for the maximum value of each row of K. Such calculation can be performed with amount of calculation for O(N).

Figure 9:
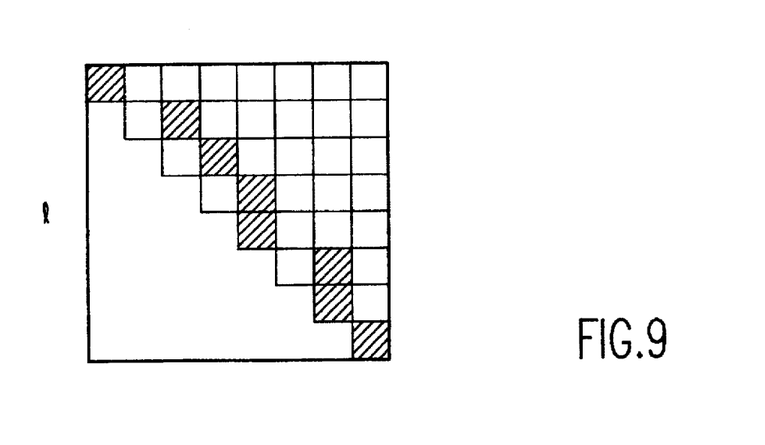
FIG. 9 is a diagram for explaining a monotonic matrix.

When the maximum value of each row is noted in K, the column number for maximum value monotonically increases as the row number increases. However, if there are a plurality of maximum values on the same row, only the one at the left end is considered. Such matrix is referred to a "monotonic matrix." Although its demonstration is omitted, the matrix K is also a "completely monotonic matrix" (a matrix in which any partial matrix is a monotonic matrix). An example of K is shown in FIG. 9 in which shaded areas represent the maximum value in each row. Amount of calculation for O (N log N) is required to calculate column numbers having the maximum values of all rows in a monotonic matrix.

Likewise, when low(t) is calculated, it is obtained by constructing a matrix L in which B in Equation 5 in the continuous interval [i, j] is contained in an element L (j, i), and finding the column number for a column having the maximum value on the row number t. Here, the upper triangular area (i>j) is to be −∞. Such matrix is also a completely monotonic matrix.

Using low(t) and high(l) thus found, cover (t,l) can be found so that the following equation which is a variation of Equation 5 can be calculated.

$$U(m,t) = \max_l \left\{ U(m-1,l) + n \sum_{i \in \text{cover}(t,l)} g(i,m) - \alpha(\text{high}(l) - \text{low}(t) + 1) \right\} \quad (7)$$

An image making U (m, t) maximum can be found by sequentially calculating U (m, t) for bands perpendicular to the X-axis, storing these bands, and then connecting them.

To further improve the speed, a matrix M' is constructed which has $$M'(t,l) = U(m-1,l) + n \sum_{i \in \text{cover}(t,l)} g(i,m) - \alpha(\text{high}(l) - \text{low}(t) + 1) \quad (8)$$

as its element. Then, the maximum value of the row number t is U (m,t). M' is a completely monotonic matrix described above, and U (m,t) can be calculated for all t with O(N). Thus, amount of calculation of O ($N^7$) is necessary to calculate U (m,t) for all m.

While detail is described in the above, necessary steps are as follows:

(1) Calculate low(t) and high(l) for all bands perpendicular to the X-axis.
(2) Calculate a matrix M' with Equation 8 as its element since cover (t, l) is found from low (t) and high (l).
(3) Find the maximum value of each row in the matrix M', and store their values as U (m, t).
(4) Enter the column number l indicating the maximum value of each row in the matrix M' into s (m, t) to determine the entire image. Also, store the number of pixels in P (m, t).
(5) Find m and t maximizing U (m, t), and determine the image with low (t) and high (l) in the previous column by using s (m, t) obtained in (4) and l stored in s (m, t). The number of pixels can be also determined from P (m, t).

Figure 10:
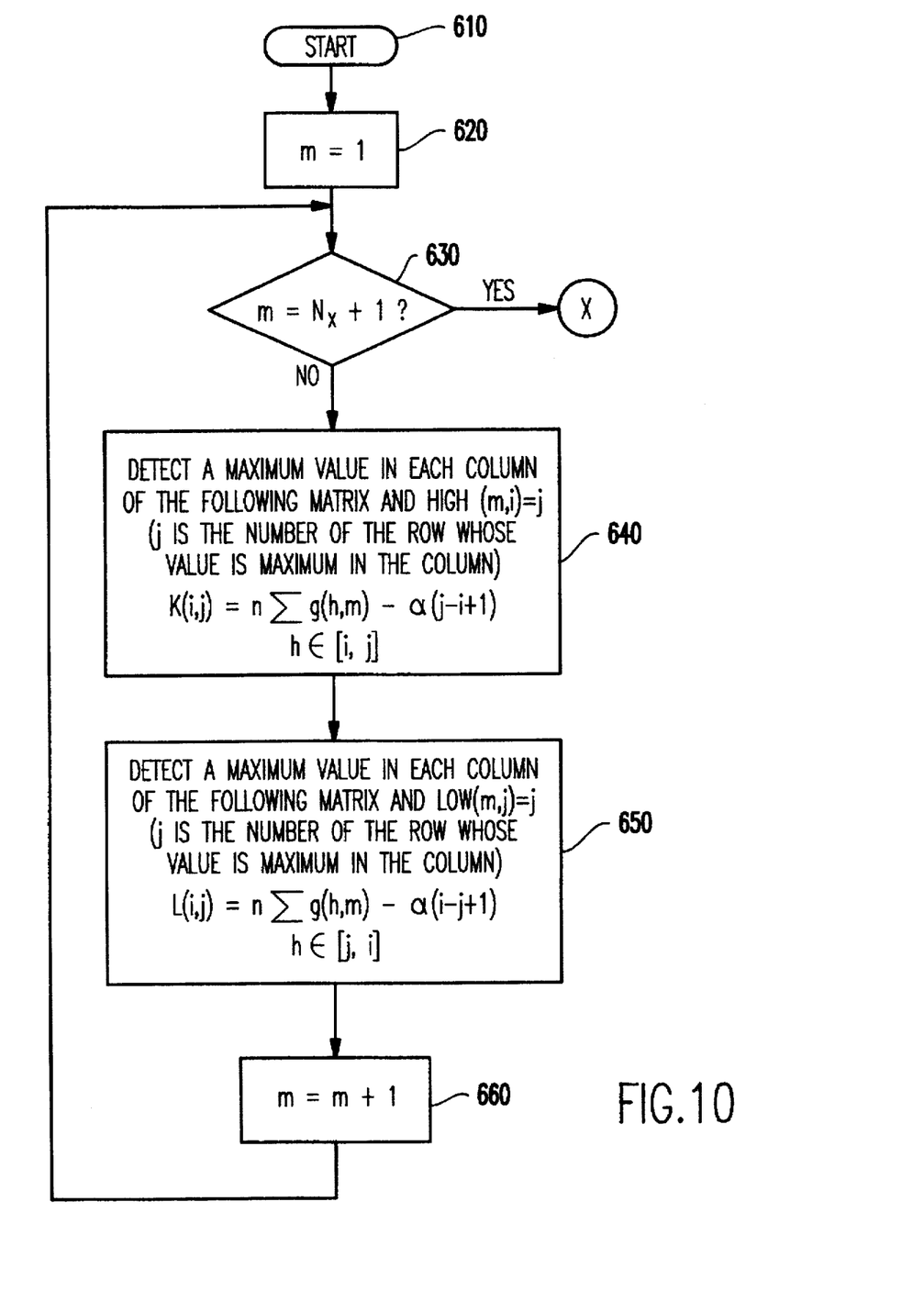
FIG. 10 is a diagram showing a flow for segmenting an image.
Figure 11:
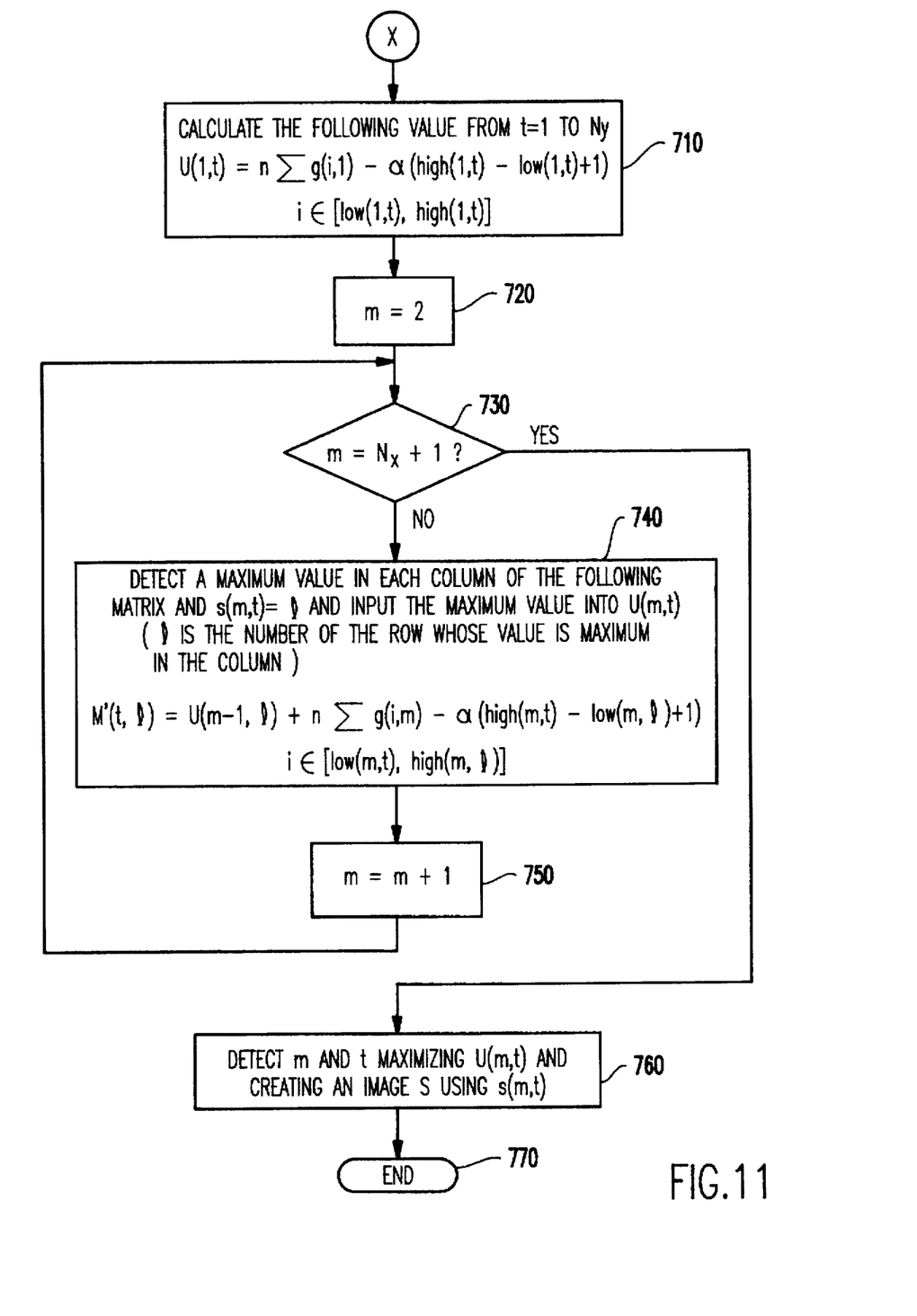
FIG. 11 is a diagram also which shows a flow for segmenting an image.

These steps are shown in FIGS. 10 and 11. The process started at step 610 performs initialization of m=1 at step 620. It is then determined whether m=Nx+1 (step 630). This is to repeat the loop Nx times where Nx is the number of columns in an image with gray levels (matrix).

Then, $$K(i,j) = \begin{cases} -(i-j)x, & (i > j) \\ n \sum_{h \in [i,j]} g(h,m) - \alpha(j-i+1), & (i \leq j) \end{cases} \quad (9)$$

is calculated to find the maximum value of each row in this matrix. The column number j of the maximum value is designated as high (m, i) (step 640). Thus, high (i) on m-th column of the image with gray levels is found.

In addition, $$L(i,j) = \begin{cases} -\infty, & (j > i) \\ n \sum_{h \in [j,i]} g(h,m) - \alpha(i-j+1), & (i \leq j) \end{cases} \quad (10)$$

is calculated to fine the maximum value of each row in this matrix. The column number j of the maximum value is designated as low (m, i)=j (step 650). Thus, low (i) on m-th column of the image with gray levels is found.

Then, the process increments m by 1 (step 660), and returns to step 630. As described, first, all low and high are previously calculated. Although it may be arranged to calculate necessary low and high every execution of calculations in FIG. 11, they may be calculated at once as in this example. After they are calculated at once as described above, the process proceeds to FIG. 11 through X.

In FIG. 11, the process calculates U (m, t) from X. First, processing is performed on the left most column of the image with gray levels as shown in FIG. 8.

$$U(1,t) = n \sum_{i \in [\text{low}(1,t),\text{high}(1,t)]} g(i,1) - \alpha(\text{high}(1,t) - \text{low}(1,t) + 1) \quad (11)$$

is calculated for t=1 to Ny (step 710). Here, Ny is a row number of the image with gray levels (matrix). With such procedure, one to be the initial value of the first term in Equation 8 is calculated. In addition, the number of pixels is calculated here because it is used in later processing. Thus, the value of the following equation is also stored.

$$P(1, t) = \text{high} (1, t) - \text{low} (1, t) + 1 \quad (12)$$

Then, m is set to m=2 to calculate values for m=2 and thereafter (step 720). In addition, it is determined whether m=Nx+1 to repeat the loop (Nx−1) times (step 730). Unless m=Nx+1, $$M'(t,l) = U(m-1,l) + \quad (13)$$
$$n \sum_{i \in [\text{high}(m,t),\text{low}(m,l)]} - \alpha(\text{high}(m,t) - \text{low}(m,l) + 1)\}$$

is calculated to find the maximum value of each row in this matrix M', and to designate its column number l as s(m,t)=1 and the value at column number l as U (m, t) (step 740).

Since the column number l is inputted into s(m,t), s(m,t) indicates the connection state between (m−1)-th and m-th columns of the image with gray levels. Thus, it could be determined how the image is connected by tracing s (m, t). In addition, p (m, t) is also held as:

$$P(m, t) = P(m-1, l) + (\text{high}(m, l) - \text{low}(m, t) + 1) \quad (14)$$

Then, the process increments m by 1 (step 750), and returns to step 730. When the repetition completes, m and t maximizing U (m, t) are found. It is necessary that m and t providing maximum are arranged to be continuously held while constructing U (m, t), and to be updated when a point whose value is lager than a value of (m,t), being held, is encountered in a newly created area. l for the previous column is found from s (m, t) by using m and t. The smaller of l and t is entered in low, and the larger is entered in high. For example, if t is the smaller, low (m, t) and high (m, l) can be found. Furthermore, since l' in the previous column is found from s (m−1, l), low (m−1, l') and high (m−1, l') are found. Here, l is smaller than l'. When such procedure is repeated, the entire image S can be determined (step 760). In addition, an object to be compared with k can be determined with P (m, t).

Furthermore, while it has not been described above, additional technique is required. U (m, t) is not increased as a whole even if negative B in Equation 5 is added. Therefore, if the maximum value for a row in M' (t, l) has a negative value in performing step 740, it is necessary to discontinue connection by inputting a predetermined value in corresponding m and t. That is, while the column number l having the maximum value of a row is entered in s (m, t), the chain is broken by entering a value with no possibility as a column number so that it is not included in the image S ultimately obtained.

The items discussed in above Appendix are further generalized. That is, when αHm in B in Equation 5 is generalized as N, low and high can be represented as follows:

$$K(i,j) = \begin{cases} -(i-j)\alpha & (i > j) \\ \sum_{h \in [i,j]} (g(h,m) - N) & (i \leq j) \end{cases} \quad (15)$$

$$L(i,j) = \begin{cases} -\infty & (j > i) \\ \sum_{h \in [j,i]} (g(h,m) - N) & (i \leq j) \end{cases} \quad (16)$$

U (m, t) can be also rewritten as follows:

$$U(m,t) = \max_l \left\{ U(m-1,l) + \sum_{i \in cover(t,l)} (g(i,m) - N) \right\} \quad (17)$$

Even with such generalization, the steps described in paragraph 0036 can be executed as is. It is a matter of course that M' (t, l) should be modified as in U (m, t).

$$M'(t,l) = U(m-1,l) + \sum_{i \in [low(m,t), high(m,l)]} (g(i,m) - N) \quad (18)$$

This generalization is described as follows:

A method for segmenting a partial image from a whole image having a plurality of pixels with gray levels, the partial image being convex in the direction of the column in the whole image, comprising the steps of: inputting a predetermined condition N; determining a range of the pixels (high(l), low(t)) in each column of the whole image, wherein the range includes at least one particular pixel (for example (i,j)) and has a maximum evaluation value within the column, the evaluation value being a total sum of a value (g(i,j)−N) calculated by subtracting the N from a gray level g(i,j) of each of pixels within the partial image; when an evaluation area including a area which includes a first pixel (coordinates (m−1,l)) in a previous column of a second pixel (coordinates (m,t)) in the whole image and has a maximum evaluation value (U(m−1,l)) up to the previous column and a range (cover (t,l)) which includes the second pixel and a third pixel (coordinate (m,l)) located in the same row as the first pixel and in the same column as the second pixel and has a maximum evaluation within the column of the third pixel and the second pixel, the range being determined by the determining step, is defined, for each of the second pixels, detecting one of the first pixels ((m−1,l)) whose inclusion in the evaluation area makes the evaluation value of the evaluation area maximum, and storing the evaluation value (U(m,t)) of the evaluation area and the one of the first pixel; and detecting one of the second pixels included in the evaluation area which has a maximum evaluation value in the whole image, and determining a partial image S by using the detected first pixel for the detected second pixel.

Advantages of the invention

As has been described hereinbefore, a partial image which is a clear admissible image close to a predetermined size can be segmented while reducing computing time.

While the amount of calculation has been $O(n^{2.5})$ for the conventional method using a statistical covariance, the method according to this invention can perform in the order of $O(n \log n)$. Therefore, when an image (n=40000) of 200 pixels×200 pixels is handled, the operation speed of this invention is about 520,000 times relative to that of the conventional method.

I claim:

1. A method for segmenting a partial image from a whole image having a plurality of pixels with gray levels, comprising the steps of:

inputting a number k of pixels of the partial image to be segmented;

detecting a partial image maximizing $$U_\alpha(S) = n \sum_{(i,j) \in S} g(i,j) - \alpha|S|$$

where n is the number of pixels of said whole image, g(i,j) is the gray level of a pixel (i, j), α is a parameter, and |S| is the number of pixels of the partial image S;

comparing the number |S| of pixels of the partial image S maximizing $U_\alpha(S)$ with the inputted number k;

increasing a value of α if |S|>k and decreasing the value of α if |S|<k;

again executing said steps subsequent to said inputting step using the updated α; and outputting said partial image S which maximizes $U_\alpha(S)$ if |S|=k.

2. The method as set forth in claim 1, wherein, in the detecting step, said whole image is decomposed into a plurality of column areas, and then a dynamic programming is performed for said decomposed column areas.

3. The method as set forth in claim 1, wherein an evaluation value is defined as a value which is calculated by subtracting a product value of α and the number of pixels within a partial image from a total sum of the gray levels within the partial image, and said detecting step comprises the sub-steps of:

determining a range of the pixels in each column of said whole image, wherein said range includes at least one particular pixel and has a maximum evaluation value within the column;

when an addition region including an area which includes a first pixel (coordinates (m−1, l)) in a previous column of a second pixel (coordinates (m,t)) in said whole image and has a maximum evaluation value up to said previous column and a range which includes said second pixel and a third pixel (coordinate (m, l)) located in the same row as the first pixel and in the same column as the second pixel and has a maximum evaluation value within the column of the third pixel and the second pixel, said range being determined by said determining step, is defined, for said second pixel by detecting one first pixel whose inclusion in the addition region makes the evaluation value of the addition region maximum, and storing said evaluation value of said addition region and said one of the first pixel; and detecting one second pixel included in said addition region which has a maximum evaluation value in said whole image, and determining a partial image S by using said detected first pixel for said detected second pixel.

4. A method for segmenting a partial image from a whole image having a plurality of pixels with gray levels, said partial image being convex in the direction of the column in the whole image, comprising the steps of:

inputting a predetermined condition N;

determining a range of the pixels in each column of said whole image, wherein said range includes at least one particular pixel and has a maximum evaluation value within the column, said evaluation value being a total sum of a value (g(i, j)−N) calculated by subtracting said N from a gray level g(i, j) of each of pixels within the partial image:

when an addition region including an area which includes a first pixel (coordinates (m−1, l)) in a previous column of a second pixel (coordinates (m, t)) in said whole image and has a maximum evaluation value up to said previous column and a range which includes said second pixel and a third pixel (coordinate (m, l)) located in the same row as the first pixel and in the same column as the second pixel and has a maximum evaluation value within the column of the third pixel and the second pixel, said range being determined by said determining step, is defined, for said second pixel by detecting one said first pixel whose inclusion in the addition region makes the evaluation value of the addition region maximum, and storing said evaluation value of said addition region and said one of the first pixel; and detecting one second pixel included in said addition region which has a maximum evaluation value in said whole image, and determining a partial image S by using said detected first pixel for said detected second pixel.

5. An apparatus for segmenting a partial image from a whole image having a plurality of pixels with gray levels, comprising:

input means for inputting a number k of pixels of the partial image to be segmented;

detection means for detecting a partial image maximizing $$U_\alpha(S) = n \sum_{(i,j) \in S} g(i,j) - \alpha |S|$$

where n is the number of pixels of said whole image, g(i,j) is the gray level of a pixel (i, j), $\alpha$ is a parameter, and $|S|$ is the number of pixels of the partial image S;

comparison means for comparing the number $|S|$ of pixels of the partial image S maximizing $U_\alpha(S)$ with the specified number k; and control means for increasing a value of $\alpha$ if $|S|>k$ and decreasing the value of $\alpha$ if $|S|<k$, then operating said detection means using an updated $\alpha$, and outputting said partial image S which maximizes $U_\alpha(S)$ if $|S|=k$.

6. The apparatus as set forth in claim 5, wherein said detection means decomposes said whole image into a plurality of column areas and performs dynamic programming for the decomposed column areas.

7. The apparatus as set forth in claim 5, wherein an evaluation value is defined as a value which is calculated by subtracting a product value of $\alpha$ and the number of f pixels within a partial image from a total sum of the gray levels of the pixels within the partial image, and said detection means comprises:

means for determining a range of the pixels in each column of said whole image, wherein said range includes at least one particular pixel and has a maximum evaluation value within the column;

means, when an addition region including an area which includes a first pixel (coordinates (m−1, l)) in a previous column of a second pixel (coordinates (m, t)) in said whole image and has a maximum evaluation value up to said previous column and a range which includes said second pixel and a third pixel (coordinate (m, l)) located in the same row as the first pixel and in the same column as the second pixel and has a maximum evaluation value within the column of the third pixel and the second pixel, said range being determined by said determining means, is defined, for said second pixel, for detecting one said first pixel whose inclusion in the addition region makes the evaluation value of the addition region maximum, and storing said evaluation value of said addition region and said one of the first pixel; and means for detecting one second pixel included in said addition region which has a maximum evaluation value in said whole image, and determining a partial image S by using said detected first pixel for said detected second pixel.

8. An apparatus for segmenting a partial image from a whole image having a plurality of pixels with gray levels, said partial image being convex in the direction of the column in the whole image, comprising:

means for inputting a predetermined condition N;

means for determining a range of the pixels in each column of said whole image, wherein said range includes at least one particular pixel and has a maximum evaluation value within the column, said evaluation value being a total sum of a value (g(i, j)−N) calculated by subtracting said N from a gray level g(i, j) of each of pixels within the partial image:

means, when an addition region including an area which includes a first pixel (coordinates (m−1, l)) in a previous column of a second pixel (coordinates (m, t)) in said whole image and has a maximum evaluation value up to said previous column and a range which includes said second pixel and a third pixel (coordinate (m, l)) located in the same row as the first pixel and in the same column as the second pixel and has a maximum evaluation value within the column of the third pixel and the second pixel, said range being determined by said determining means, is defined, for said second pixel, for detecting one said first pixel whose inclusion in the addition region makes the evaluation value of the addition region maximum, and storing said evaluation value of said addition region and said detected first pixel; and means for detecting one second pixel included in said addition region which has a maximum evaluation value in said whole image, and determining a partial image S by using said detected first pixel for said detected second pixel.

9. A storage device comprising:

computer program code means for causing a computer to segment a partial image from a whole image having a plurality of pixels with gray levels, said partial image being convex in a column direction in the whole image, said computer program code means comprising:

computer program code means for causing the computer to input a predetermined condition N;

computer program code means for causing the computer to determine a range of the pixels in each column of said whole image, wherein said range includes at least one particular pixel and has a maximum evaluation value within the column, said evaluation value being a total sum of a value $(g(i, j)-N)$ calculated by subtracting said N from a gray level $g(i, j)$ of each of pixels within the partial image:

computer program code means, when an addition region including an area which includes a first pixel (coordinates $(m-1, l)$) in a previous column of a second pixel (coordinates $(m, t)$) in said whole image and has a maximum evaluation value up to said previous column and a range which includes said second pixel and a third pixel (coordinate $(m, l)$) located in the same row as the first pixel and in the same column as the second pixel and has a maximum evaluation value within the column of the third pixel and the second pixel, said range being defined, for said second pixel, for detecting one said first pixel whose inclusion in the addition region makes the evaluation value of the addition region maximum, and storing said evaluation value of said evaluation area and said detected first pixel; and computer program code means for causing the computer to detect one second pixel included in said addition region which has a maximum evaluation value in said whole image, and determine a partial image S by using said detected first pixel for said detected second pixel.

\* \* \* \* \*